S. C. Riley.
Steam Boiler.
No. 2,318. Patented Oct. 11, 1841.

S. C. Riley.
Steam Boiler.
N°. 2,318.   Patented Oct. 11, 1841.

Scale 1¼ inch to 1 foot.

UNITED STATES PATENT OFFICE.

SALMON C. RILEY, OF NEW YORK, N. Y.

IMPROVEMENT IN THE CONSTRUCTION OF BOILERS.

Specification forming part of Letters Patent No. 2,318, dated October 11, 1841.

*To all whom it may concern:*

Be it known that I, SALMON C. RILEY, of the city and county of New York, and State of New York, have invented a new and Improved Steam-Boiler with a Caldron Combined; and I do hereby declare that the following is a full and exact description, reference being had to the annexed drawings, making a part of this specification, in which—

Figure 2:
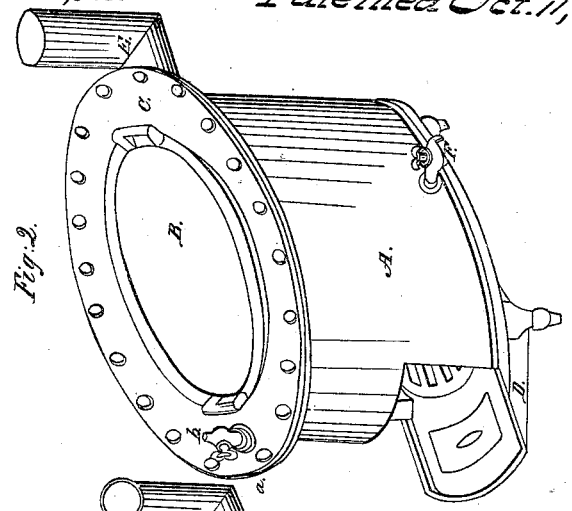
Figure 3:
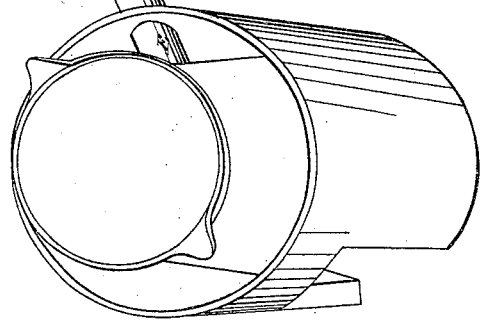
Figure 1:
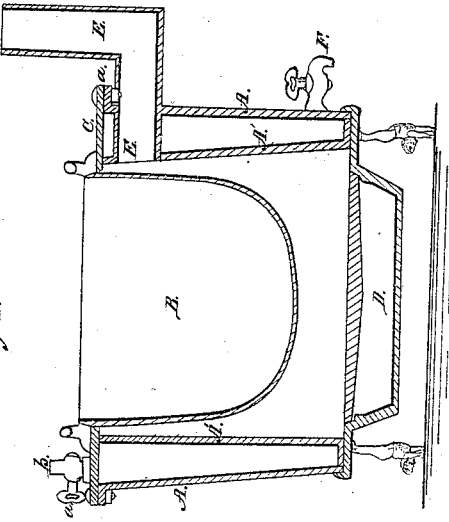
Figure 6:
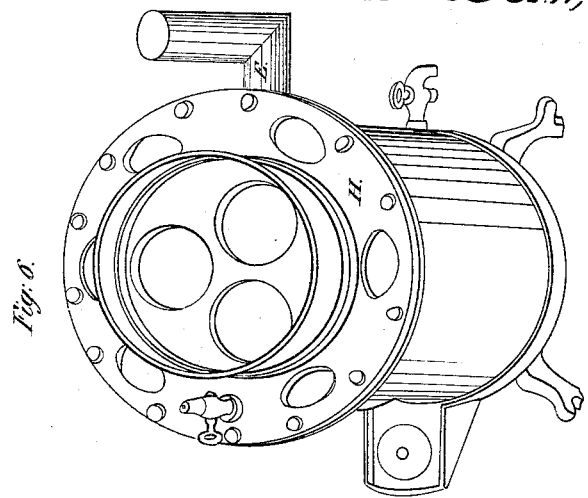
Figure 9:
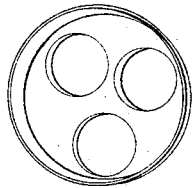
Figure 5:
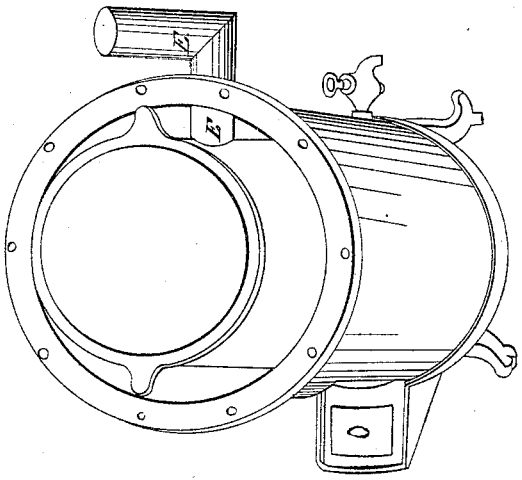
Figure 8:
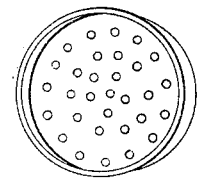
Figure 7:
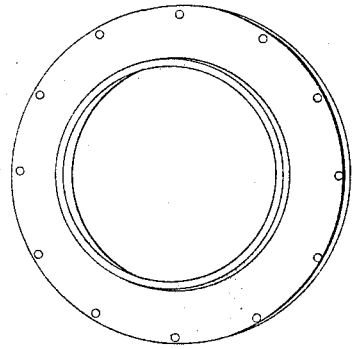
Figure 4:
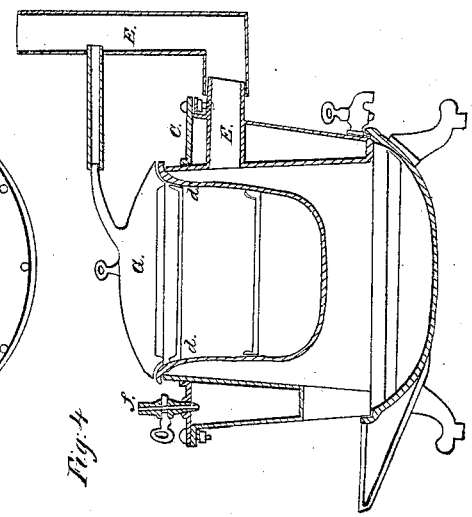

Figure 1 is a vertical transverse section showing the section of metal which would strike the eye if a boiler and caldron were split down in the middle from top to bottom. Fig. 2 is a perspective view of the same. Fig. 3 is a view of the same as used for maple sugar, without a flange, cap, or stool. Fig. 4 is a vertical cross-section modified for culinary purposes, in which the inside is somewhat elevated above the outside cylinder, and having the caldron diminished in size from that of the kind represented by Fig. 1, which is intended for agricultural purposes mainly. Fig. 5 shows the adaptation of this modification to making sugar, boiling soap, &c. Fig. 6 is a perspective view of boiler and caldron arranged and shown at vertical cross-section, Fig. 4, having a cap with apertures for culinary purposes. Fig. 7 shows the formation of the cap when the outside boiler is used for steam only; Fig. 8, a circular division-piece placed in the caldron, upon which to place vegetables above the water in the caldron to subject them to the steaming process. Fig. 9 is a plate with kettle-holes, intended to take the place of the caldron upon the boiler when used for culinary purposes.

This boiler and caldron combined is intended for agricultural purposes, for boiling and steaming hay, straw, and vegetables for cattle, for making maple sugar and beet sugar, and for various culinary and manufacturing purposes, such as cooking, boiling potash, soap, reducing blubber on whale-ships, tallow, lard, dyeing, &c.

To enable others skilled in the business of which this is a branch to make and use my invention, I will proceed to describe its construction and operation.

A A and A', Figs. 1 and 2, represent the main casting, it being a double cylinder open at top and closed at bottom, and is a water-receptacle forming the sides of the furnace.

B and B, Figs. 1 and 2, represent the caldron, suspended by the rim upon the inner cylinder of boiler.

C and C, Figs. 1 and 2, represent a cap to close up the boiler, secured by screws and nuts at the flange at $a\ a$, Figs. 1 and 2, and pierced with a valve $b\ b$, Figs. 1 and 2.

D and D, Figs. 1 and 2, represent the stool, ash-pit, and grate in the usual form.

E and E, Figs. 1 and 2, represent the smoke-pipe, leading through both cylinders A and A of the boiler.

F and F, Figs. 1 and 2, represent valve or stop-cock for drawing off the boiler.

G, Fig. 4, is the cover or lid employed when the caldron is used to steam potatoes and other vegetables.

$c$, Fig. 4, is a cap without holes for kettles, as in Fig. 7, or with holes, as shown at H, Fig. 6. When Fig. 9 is used, a casting similar to the caldron is used, wanting the lower part of the caldron below the lines $d\ d$, Fig. 4.

Having described the parts of several modifications of the same article in effect, I will now explain the use and operation.

It will be perceived that each representation is similar in the following particulars, to wit: a double cylinder to contain water and surround the furnace, which is denominated the "boiler," from which either hot water or steam may be supplied; that a caldron or a plate (see Fig. 9) is placed within the said boiler, and in either case a double surface is exposed to the action of the heat, and forming at the same time a durable inclosure for the furnace.

Figs. 1 and 2 represent one modification, and, as before suggested, intended for agricultural purposes, by which vegetables may be cooked and mashed in the caldron, while steam or hot water may be at the same time supplied for steaming hay, potatoes, turnips, &c., in a separate vessel from the boiler through a pipe leading from the valve $b$ in the same.

Fig. 3 is another modification intended to be used in making sugar and for the like purposes. The dilute liquor may be placed in the outside boiler and ladled into the caldron to concentrate the space between the two cylinders being open at top. This article may be used on a base of stone or brick or with the common stove grate and bottom.

Figs. 4, 5, and 6 represent another modification intended for culinary purposes. The remaining figures are representations of appendages to the above, suited to the variations proposed. For example, if it be desirable to use steam, a close cap (see C and Fig. 7) is placed thereon, and a pipe connected with the valve $f$ may conduct steam to any separate vessel for steaming vegetables or to a double cylinder-oven, in which every description of baking may be performed, while at the same time boiling and roasting can be carried on in the caldron, being covered by the lid G; but if it is not desirable to use steam the close cap may be removed and the one represented at Fig. 6 placed thereon, when several small kettles may be used at the same time, hot water supplied for any purpose from the boiler, and the caldron used as before described.

I do not claim the discovery of a double cylinder or the use of the caldron; but What I do claim as new, and desire to secure by Letters Patent, is—

1. The combination of the double-cylinder boiler and caldron, with the space between the double cylinder left open at top.

2. The same with a cap pierced with kettle-holes, for the purposes described.

SALMON C. RILEY.

Witnesses:
   THOS. W. HARVEY,
   AARON P. MYERS.